United States Patent [19]

Kanato et al.

[11] Patent Number: 4,825,956
[45] Date of Patent: May 2, 1989

[54] TRACTOR AND IMPLEMENT WITH IMPLEMENT INCLINATION CONTROL

[75] Inventors: Yuji Kanato; Nakashiro Mukai, both of Ehime, Japan

[73] Assignee: Iseki & Co., Ltd., Japan

[21] Appl. No.: 26,309

[22] Filed: Mar. 16, 1987

[51] Int. Cl.⁴ ............................................. A01B 63/10
[52] U.S. Cl. ......................................... 172/2; 172/446
[58] Field of Search ............................ 172/2, 4.5, 446; 280/446 A

[56] References Cited

U.S. PATENT DOCUMENTS 4,535,847 8/1985 Hasegawa et al. ............... 172/4.5 X
4,553,605 11/1985 Katayama et al. ......... 280/446 A X

FOREIGN PATENT DOCUMENTS 58-216602 12/1983 Japan .

*Primary Examiner*—Richard T. Stouffer
*Attorney, Agent, or Firm*—Burd, Bartz & Gutenkauf

[57] ABSTRACT

A roll control structure adapted to automatically control an earth working machine, such as a rotary cultivator so that the machine becomes horizontal in the lateral direction irrespective of the inclination of the ground surface, i.e., in such a manner that the machine assumes a posture preset by the operator. The roll control structure is characterized in that it is provided with left and right stroke sensors for detecting strokes, i.e. a distance between arbitrary points on the left and right lift arms in an earth working implement connecting link mechanism and those on the left and right lower links in the same mechanism to determine an angle of inclination in the lateral direction of the implement with respect to a tractor on the basis of a difference between the detected strokes.

9 Claims, 4 Drawing Sheets

TRACTOR AND IMPLEMENT WITH IMPLEMENT INCLINATION CONTROL

FIELD OF INVENTION

This invention relates to a rolling control structure which is adapted to automatically control an earth working implement, such as a rotary cultivator so that the cultivator becomes, for example, horizontal in the lateral direction irrespective of the inclination of the surface of the field. The rolling control structure when used with earth working implements does not require lateral posture detecting sensors to be changed even when the position of the earth working implement is changed. The rolling control structure is capable of simplifying the correcting operation in the computation of the lateral posture of the earth working implement and carrying out an accurate control operation.

BACKGROUND OF INVENTION

There is a known rolling control structure which is disclosed in Japanese Pat. No. 216603/1983. In this structure, the angle of inclination in the lateral direction of a tractor with respect to the ground surface is detected by a sensor attached thereto, and another sensor is fixed to an extensibly-formed lift rod cylinder provided around one of the left and right lift rods by which the lift arms and lower links of the tractor are connected together, to detect the length of the lift rod cylinder, on the basis of which the angle of inclination in the lateral direction of the ground treating machine with respect to the tractor is calculated. The angle of inclination in the lateral direction of the ground treating machine with respect to the ground surface is calculated on the basis of the angle of inclination in the lateral direction of the tractor with respect to the ground surface and the angle of inclination in the lateral direction of the ground treating machine with respect to the tractor to thereby control the extension and retraction of the lift rod cylinder so that the angle of inclination in the lateral direction of the ground treating machine is in conformity with the posture, which is preset by the operator, in the lateral direction of the same machine.

Since both of the above two sensors are attached to the tractor, the sensor re-attaching operation is not required even when the ground treating machine is changed. However, the correction calculations made when the above angle of inclination in the lateral direction of the ground treating machine on the basis of the values detected by the sensors are very complicated. Therefore, this rolling control structure has a low practicality.

The angle of inclination with respect to the ground surface of the lift rod cylinder in side elevation thereof varies greatly with the vertical movements of the lift arms and lower links. Accordingly, the vertical component of the amount of extension and retraction of the lift cylinder, which is an important numerical value for the calculation of the angle of inclination in the lateral direction of the ground treating machine, varies greatly with the vertical movements of the lift arms and lower links. Hence, in order to determine the vertical component mentioned above, on the basis of the values detected by the sensor, by which the amount of extension and retraction is detected, making complicated geometrical correction calculations is required. In this known structure, it is necessary to detect the angles of pivotal movements of the lift arms by independent lift arm sensors, and correct the heights of the lift arms of the ground treating machine when calculating the angle of inclination in the lateral direction thereof and add these corrected values in the calculation of this angle of inclination. In order to carry out a rolling control operation, it is necessary to make such various kinds of complicated calculations of correction amounts. Moreover, it is difficult to calculate correction amounts accurately in a short period of time.

SUMMARY OF INVENTION

An object of the present invention is to solve the problems of the above-described known techniques for controlling the roll of an implement about a horizontal longitudinal axis or the lateral angle of inclination of an implement. The roll control structure of the invention is incorporated in a tractor having a hitch that connects an implement to the tractor. The implement may be an earth moving or working machine, ground treating machine, and be provided with a blade for grading earth, snow, manure, and the like. A linear actuator connected to the hitch is operable to control the lateral angle of inclination of the implement relative to the lateral inclination of the tractor. A first sensor mounted on the tractor measures the lateral angle of inclination of the tractor and provides a first signal related thereto. A second sensor associated with a hitch is used to determine the lateral angle of inclination of the implement and provide a signal related thereto. An adjustable means is used to provide a second signal related to the desired lateral angle of inclination of the implement. The signals are used to control a means that operates the actuator to position the implement at a desired lateral angle of inclination relative to the tractor and the ground. This enables the operator of the tractor to independently adjust the roll position or lateral angle of inclination of the implement during the operation of the tractor and implement.

The roll control apparatus according to one modification of the invention is used with a tractor having hitch means connecting an earth working implement to the tractor. The hitch means has first and second draft links and a control link connected to the earth working implement for trailing the implement behind the tractor. First and second lift arms are spaced above the first and second draft links. Link means connect the first and second lift arms to the first and second draft links. Power means associated with the tractor is used to move the first and second lift arms and thereby move the draft links to change the elevation of the earth working implement. One of the link means that connect the arms to the draft links has a linear actuator operable to change the elevation of the draft link independent of the opposite draft link. In this manner, the lateral angle of inclination of the earth working implement can be changed relative to the tractor and the ground. Sensors are used to detect the angle of inclination in the lateral direction of the tractor with respect to the ground and the angle of inclination and the lateral direction of the earth working implement with respect to the tractor. On the basis of the values of the angles thus detected, the angle of inclination and the lateral direction of the earth working implement with respect to the ground is determined. The linear actuator is a device that can be elongated and contracted, such as a piston and cylinder assembly, which is controlled on the basis of the angle of the inclination determined to thereby control the earth working implement to a predetermined angle of inclination in the lateral direction with respect to the ground surface. The sensors include a first sensor mounted on the tractor for sensing the lateral angle of inclination of the tractor. A second sensor senses the distance between the first draft link and the first lift arm. A third sensor senses the distance between the second draft link and the second lift arm. A desired angle of inclination of the implement is set with an adjustable component, such as a potiamometer, that cooperates with the signal from the sensor related to the lateral angle of inclination of the tractor to control the operation of the linear actuator.

The above and other objects as well as advantageous features of the invention will become apparent from the following description of the preferred embodiment taken in conjunction with the accompanying drawing.

DESCRIPTION OF THE PREFERRED EMBODIMENT

Figure 1:
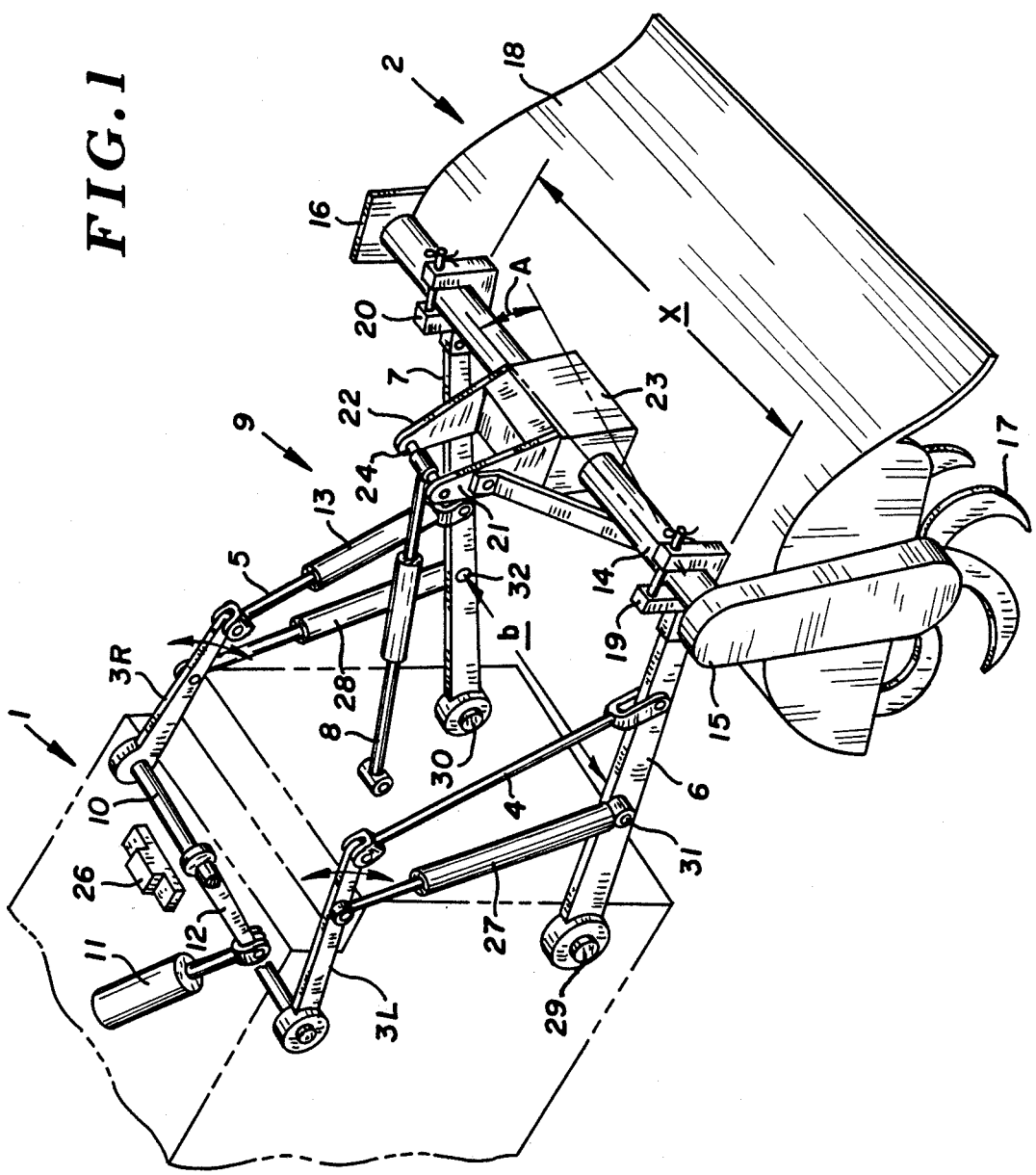
FIG. 1 is a perspective view of an earth working implement equipped with the rolling control structure of the invention.

As shown in FIG. 1, a rotary cultivator 2, as an example of an earth working implement or ground treating machine 717, is connected to the rear portion of a tractor 1 by a hitch 9. Hitch 9 is a three-point link mechanism, which consists of left draft link 6 and right draft link 7 connected to left and right lift arms 3L and 3R via left and right lift rods 4 and 5. Draft links 6 and 7 can be moved in the vertical direction with respect to their pivotal connection to tractor 1. Draft links 6 and 7 are pivotally connected in a conventional manner to opposite sides of the rear transmission case of tractor 1. A central top control link 8 is pivotally connected to the back of tractor 1 and extends rearwardly therefrom. Draft links 6 and 7 and control link 8 are connected to rotary cultivator 2 as hereinafter described. Hitch 9 is adapted to be moved vertically by a hydraulic lift cylinder 11. Lift arms 3R and 3L are secured to opposite ends of a shaft 10 rotatably mounted on the rear transmission casing of tractor 1. A crank arm 12 secured to shaft 10 is connected at the lower end thereof to the piston rod of cylinder 11. Cylinder 11 coupled to the hydraulic system of tractor 1 is operated in response to a control valve (not shown). When cylinder 11 is expanded, shaft 10 is rotated to raise lift arms 3R and 3L. Draft links 6 and 7 move upwardly raising rotary cultivator 2 out of the ground.

Lift rod 5 includes a linear actuator, such as a piston and cylinder assembly 13 operable to control the rolling of rotary cultivator 2 about a generally longitudinal horizontal axis. The piston and cylinder assembly 13 controls the posture in the lateral direction of rotary cultivator 2 with respect to tractor 1.

Rotary cultivator 2 has a generally transverse horizontal beam 14 supporting downwardly directed end members 15 and 16. A rotary working tool 17 having a plurality of earth cutting tines or knives is rotatably mounted on the lower ends of end members 15 and 16. A power transmission including a gear box 23 is used to rotate earth working tool 17. A hydraulic motor (not shown) can be used to supply power to gear box 23. Alternatively, gear box 23 can be replaced with a hydraulic fluid operated motor. A power take off shaft can connect tractor 1 to gear box 23 to transmit power thereto. The top of the rotary earth working tool 17 is enclosed within a hood 18. Couplings or U-shaped holders 19 and 20 connect the rear ends of draft links 6 and 7 to beam 14. A pair of upwardly projected ears or plates 21 and 22 are secured to opposite sides of gear box 23. A pin 24 pivotally connects control rod 8 to ears 21 and 22.

The lateral inclination of tractor 1 with respect to the ground surface is detected by using a lateral inclination sensor 26 which consists of a bubble or a weight sensor. Sensor 26 is mounted on top of the rear transmission case of tractor 1 in a generally horizontal position. An angle of inclination A in the lateral direction of 2 with respect to tractor 1 is calculated on the basis of the strokes of linear sensors 27 and 28 which represent the distance between left lift arm 3L and left lower link 6 and that between the right lift arm 3R and right lower link 7. Sensors 27 and 28 are linearly movable potentiometers. Other types of linear sensing devices can be used to sense the linear distance between the lift arms and the draft links. Stroke sensors 27 and 28 are fixed in the positions in which the variations of lengths in the vertical direction of the strokes are within the range of the vertical movements of lift arms 3L and 3R and lower draft links 6, 7 during a ground treating operation when draft links 6 and 7 are in their lower or down positions.

A method of calculating an angle of inclination in the lateral direction of rotary cultivator 2 with respect to the tractor will now be described.

To simplify the description of this method, the positions in which the left and right stroke sensors 27 and 28 are fixed shall laterally correspond to each other. Accordingly, even when lift arms 3L and 3R are vertically moved with lift rods 4 and 5 left in the laterally corresponding positions, the rear portions of the left and right lower draft links 6, 7 are in the positions of the same height.

Figure 3:
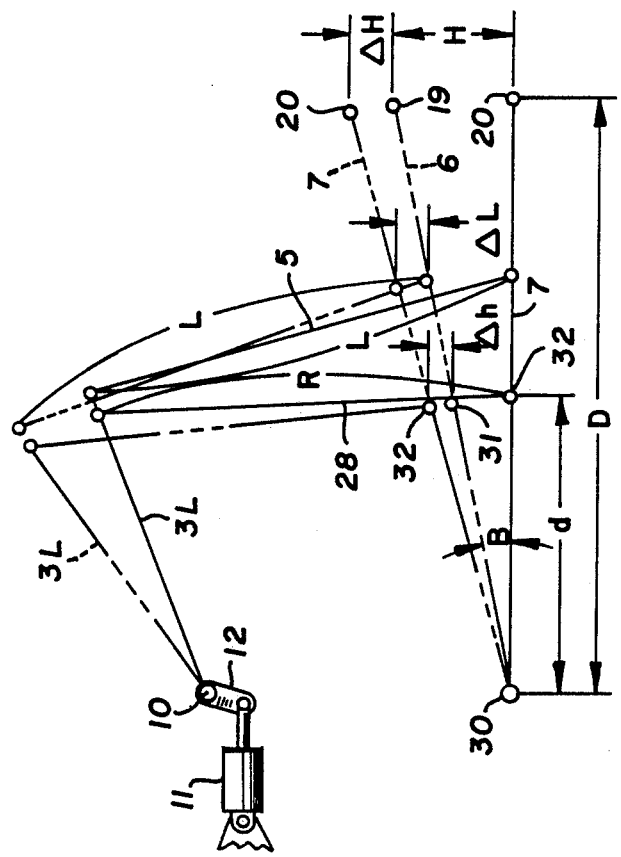
FIG. 3 is a diagrammatic view of the right hitch link, lift arm, and right vertical linear sensor of the roll control structure of FIG. 1.
Figure 2:
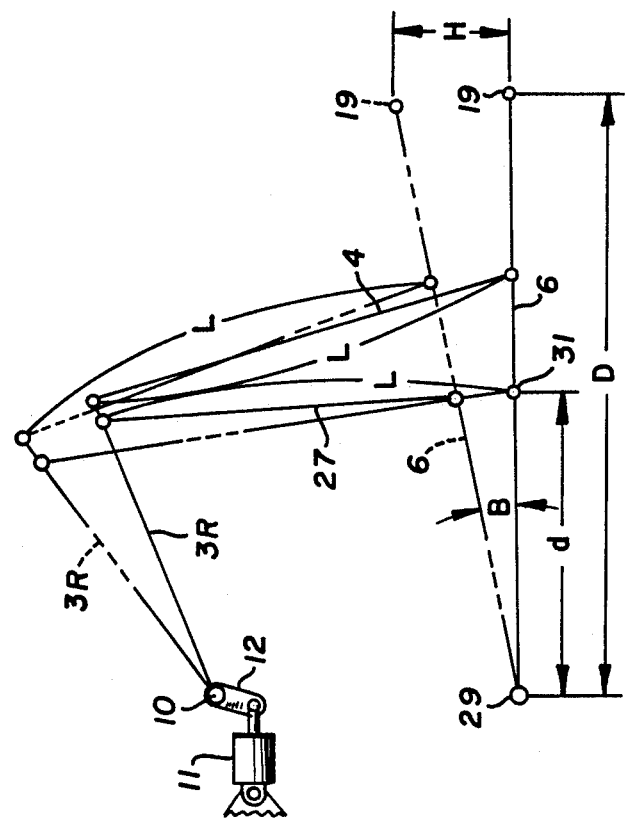
FIG. 2 is a diagrammatic view of the left hitch links, lift arm, and left vertical linear sensor of the roll control structure of FIG. 1.

FIGS. 2 and 3 are diagrammatic side elevations showing the positions of lift arms 3L and 3R, lower links 6 and 7 and lift rods 4 and 5. As shown in FIGS. 2 and 3, if the right lift rod 5 is retracted by L, the position of the right lower link 7 becomes higher than that of the left lower link 6 by H. Accordingly, the angle of inclination A in the lateral direction of cultivator 2 with respect to tractor 1 can be calculated on the basis of the formula A=(sin H/X), wherein X is the distance between the rear end portions 19 and 20 of lower links 6 and 7.

At the same time, the lower end portion of the right stroke sensor 28 becomes higher than that of the left stroke sensor 27 by h, on the basis of which H is determined. Let D and d equal the length of each of the lower links 6 and 7 and the distance between the fulcrums 29 and 30 of pivotal movement of each of the lower links and the pins or positions 31 and 32 in which the stroke sensors 27 and 28 are pivotally connected to lower links 6 and 7, respectively. The formula h=d/D H can then be established. The distance b between positions 31 and 32 in which stroke sensors 27 and 28 are pivotally connected to lower links 6 and 7 is constant with respect to the distance x between the rear portions of the lower links 6 and 7. Therefore, the angle of inclination A in the lateral direction of cultivator 2 with respect to tractor 1 can be determined by a first-degree calculation formula having h as a variable.

Figure 4:
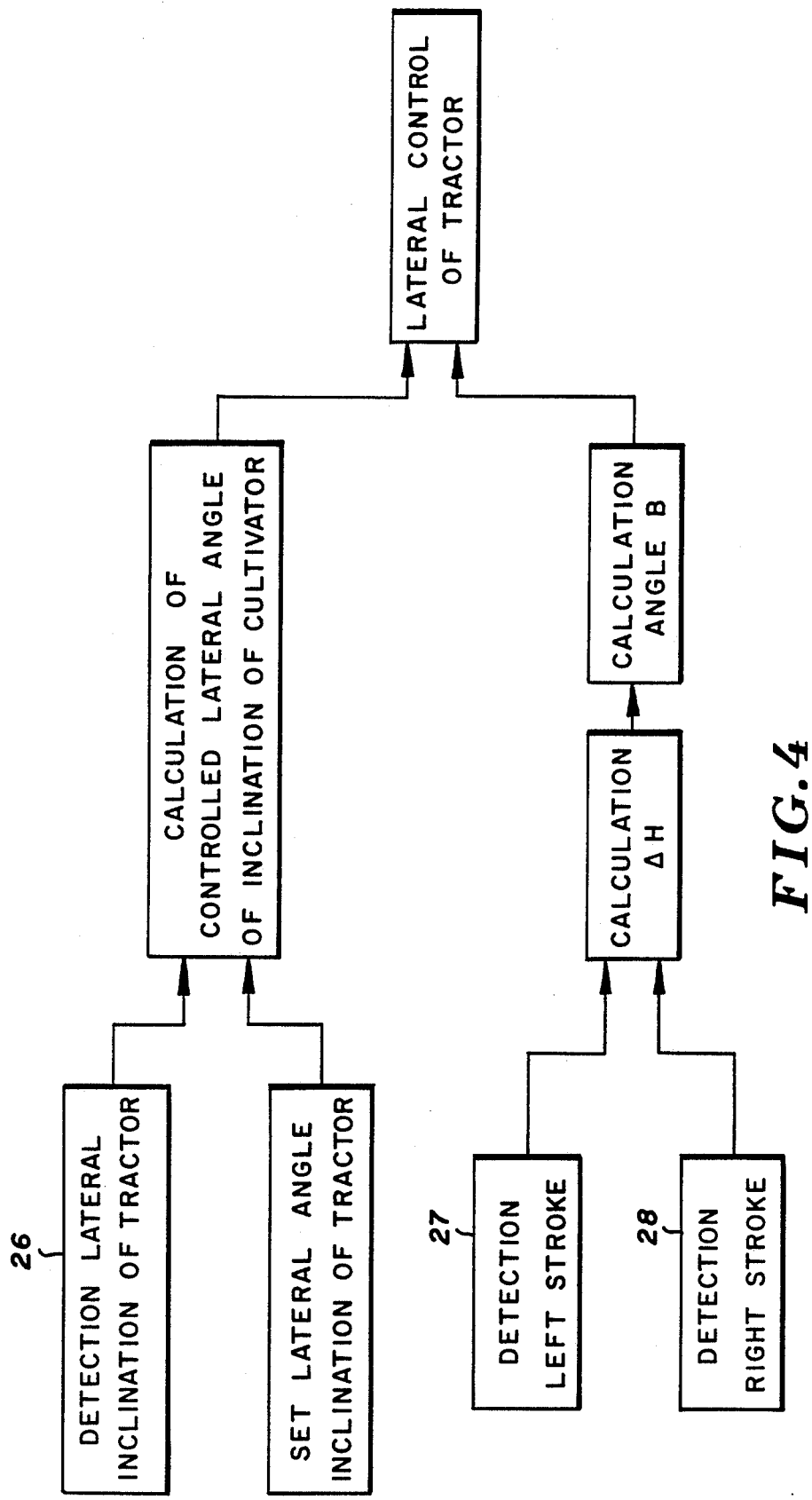
FIG. 4 is a block diagram showing the procedure of a rolling control operation.

Stroke sensors 27 and 28 can be fixed in the positions in which the posture of cultivator 2 with respect to the ground surface varies little. Accordingly, H can be determined substantially with a high accuracy by always multiplying the value, which is detected in each position during an operation of cultivator 2, by a predetermined rate. Thus, the angle of inclination A in the lateral direction of cultivator 2 with respect to tractor 1 can be determined with a high accuracy on the basis of left and right strokes L and R without making any complicated correction calculations. The procedure of determining this angle A is shown in FIG. 4.

Figure 5:
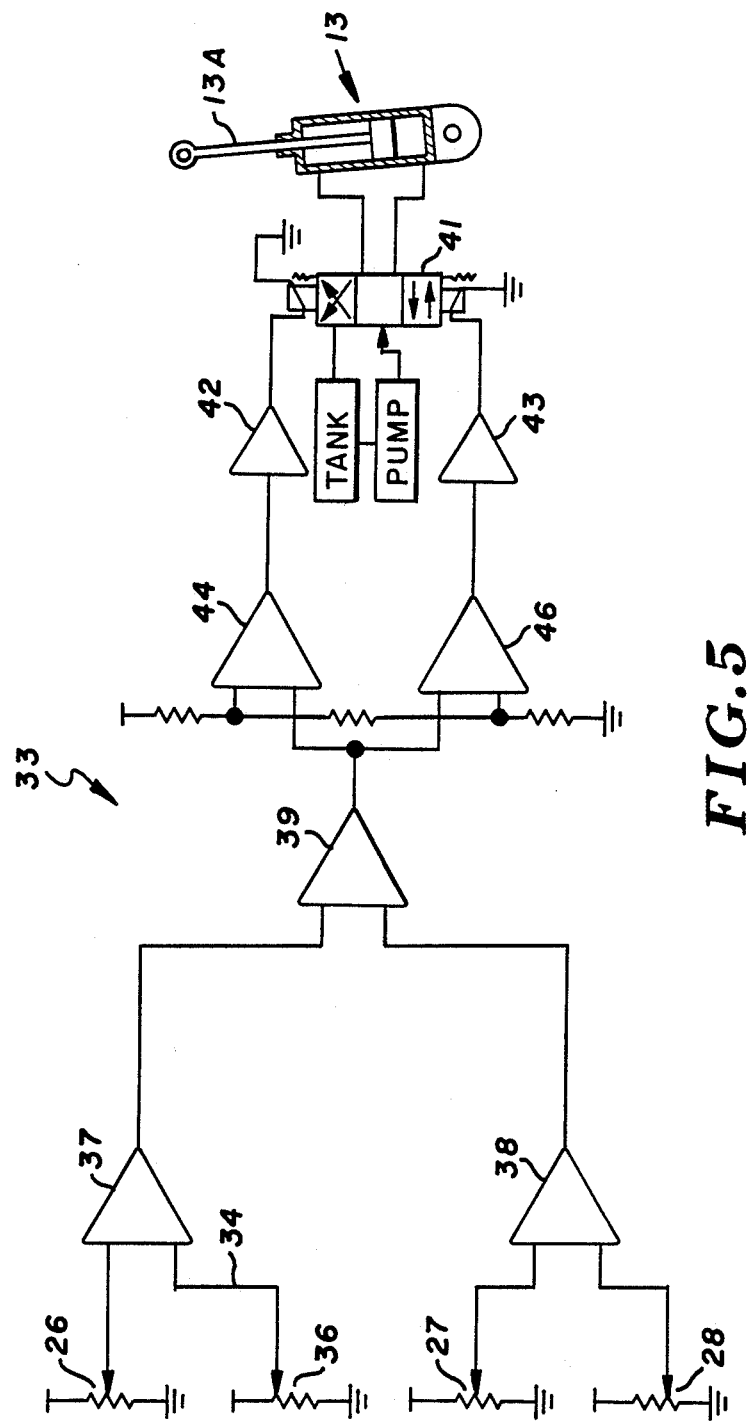
FIG. 5 is a block diagram of a control circuit of the rolling control structure of the invention.

An example of a roll control unit 33, which is adapted to control cultivator 2 and similar ground treating machines to a predetermined angle of inclination in the lateral direction thereof, will now be described on the basis of FIG. 5. A value of angle of inclination in the lateral direction of cultivator 2 with respect to the ground surface, which is set by a setting dial 34 of a lateral angle of inclination setter 36, which consists of a pivotable or linearly-movable potentiometer. The value of the angle of inclination in the lateral direction of tractor 1 with respect to the ground surface, which is set by the lateral inclination sensor 26, are inputted into a differential amplifier 37, in which a controlling angle of inclination in the lateral direction of cultivator 2 with respect to tractor 1 is calculated.

The strokes L and R detected by the stroke sensors 27 and 28 are inputted into an operational amplifier 38, in which a stroke difference is calculated. In operational amplifier 38, H and the angle of inclination A in the lateral direction of cultivator 2 with respect to tractor 1 are also calculated.

The outputs from differential amplifier 37 and operational amplifier 38 are inputted into a differential 39. The shifting of an electromagnetic valve 41 is controlled by driving amplifiers 42 and 43 on the basis of an output from differential amplifier 39 so that the angle of inclination A in the lateral direction f cultivator 2 with respect to tractor 1 agrees with the lateral inclination controlling angle with respect to tractor 1, to supply oil under pressure from a pump to lift rod cylinder 13 or discharge the pressure oil from lift rod cylinder 13 into a tank to control movement of piston rod 13A. In the illustrated example, when the difference between the angle of inclination A in the lateral direction of cultivator 2 with respect to tractor 1 and the lateral inclination controlling angle with respect to tractor 1, i.e. a laterally biased angle is, for example, within the range of certain low levels, comparators 44 and 46 are operated so that an output is not generated in the driving amplifiers 42 and 43, to thereby prevent hunting from occurring in the control operation.

Various types of electronic circuits having the above-described functions can be used practically as the roll control unit 33.

Left lift rod 4 in the illustrated embodiment may also be made extensible and retractable by using a lift rod cylinder (not shown) in the same way as the right lift rod. In this case, the above-described structure according to the present invention can also be used.

The roll control structure for ground treating implements according to the present invention is constructed as described above. The strokes L and R, which represent the distances between the arbitrary corresponding positions on the left and right lift arms 3L and 3R and those on lower links 6 and 7, are detected by stroke sensors 27 and 28 and the angle of inclination A in the lateral direction of cultivator 2 with respect to tractor 1 is calculated on the basis of a difference between the strokes L and R. Therefore, the positions in which the stroke sensors 27 and 28 are fixed can be selected so that the angles of inclination in the longitudinal direction of the stroke sensors 27 and 28 are substantially constant, irrespective of the positions in the vertical direction of the lift arms 3L and 3R. If the positions in which the stroke sensors 27 and 28 are fixed are set in this manner, the vertical components of the values detected by stroke sensors 27 and 28 always become substantially proportional to these detected values. Accordingly, the angle of inclination A in the lateral direction of cultivator 2 with respect to tractor 1 can be determined by simple calculations based on a difference between the values detected by stroke sensors 27 and 28. This enables a roll control operation to be carried out with high accuracy.

The vertical movement of a ground treating implement 2, connected to left and right lower draft links 6, 7 of hitch 9, is controlled on the basis of the movements of the left and right lift arms 3L and 3R which are adapted to be turned vertically by a hydraulic lift cylinder 11. At least one of lift rods 4 or 5, by which the left and right lift arms 3L and 3R and left and right lower links 6 and 7 are connected together, is formed of a lift rod piston and cylinder assembly 13 which can be extended and retracted by a hydraulic pressure. The angle of inclination in the lateral direction of tractor 1 with respect to the ground surface and the angle of inclination in the lateral direction of implement 2 with respect to the tractor are detected, and, on the basis of the values of angles thus detected, the angle of inclination in the lateral direction of implement 2 with respect to the ground surface is determined. The extension and retraction of the lift rod piston and cylinder assembly 13 are controlled on the basis of the angle of inclination thus determined, to thereby control implement 2 to a predetermined angle of inclination in the lateral direction thereof with respect to the ground surface. This structure is characterized with left and right stroke distances between arbitrary points on the lift arms 3L and 3R and those on the lower draft links 6 and 7, to determine an angle of inclination in the lateral direction or roll position of the implement with respect to the tractor 1 on the basis of a difference between the detected left and right strokes.

The strokes or the distances between the arbitrary points on the lift arms 3L and 3R and those of the lower draft links 6 and 7 are detected by the left and right stroke sensors 27 and 28. The angle of inclination in the lateral direction of the implement 2 with respect to the tractor 1 is calculated on the basis of a difference between these strokes. Accordingly, if the stroke sensors 27 and 28 are fixed to suitable selected positions, the angles of inclination in a side elevation thereof with respect to the ground surface becomes substantially constant irrespective of the vertical positions of lift arms 3L and 3R. Therefore, the vertical components of the values detected by stroke sensors 27 and 28 always become substantially proportional to these detected values. This enables an angle of inclination in the lateral direction of implement 2 with respect to the tractor 1 to be determined accurately by a simple calculation based on the difference between the values detected by the stroke sensors 27 and 28. Consequently, a rolling control operation can be carried out with a high accuracy.

The present invention is not, of course, limited to the above embodiment; it may be modified in various ways within the scope of the appended claims.

We claim:

1. In combination: an earth working implement, a tractor having hitch means connected to the earth working implement, said hitch means having first and second draft links and a control link connected to the earth working implement, first and second lift arms spaced from the first and second draft links, first and second link means connecting the first and second lift arms with the first and second draft links, power means for moving the first and second lift arms and thereby moving the draft links to change the elevation of the earth working implement, first sensor means mounted on the tractor for sensing the lateral angle of inclination of the tractor, second sensor means connected to the first draft link and first lift arm for sensing the distance between the first draft link and the first lift arm, third sensor means connected to the second draft link and second lift arm for sensing the distance between the second draft link and the second lift arm, said second link means including a linear actuator connected to the second draft link and the second lift link, and means responsive to the first, second, and third sensor means for controlling the linear actuator to adjust the lateral angle of inclination of the earth working implement.

2. The structure of claim 1 wherein: the linear actuator comprises a piston and cylinder assembly operable with fluid under pressure.

3. The structure of claim 2 wherein: the means responsive to the first, second, and third sensor means includes a solenoid actuated valve means and pump means for supplying fluid under pressure to the valve means.

4. The structure of claim 1 wherein: the means responsive to the first, second, and third sensor means includes means to set the lateral angle of inclination of the tractor, and means for calculation of the control lateral angle of inclination of the earth working implement to provide lateral inclination control of the earth working implement.

5. In combination: an earth working implement, a tractor having hitch means connected to the earth working implement, said hitch means having first and second draft links and a control link connected to the earth working implement, first and second lift arms spaced from the first and second draft links, first and second link means connecting the first and second lift arms with the first and second draft links, power means for moving the first and second lift arms and thereby moving the draft links to change the elevation of the earth working implement, first sensor means mounted on the tractor for sensing the lateral angle of inclination of the tractor, second sensor means connected to the first draft link and first lift arm for sensing the distance between the first draft link and the first lift arm, third sensor means connected to the second draft link and second lift arm for sensing the distance between the second draft link and the second lift arm, said second link means including a linear actuator connected to the second draft link and the second lift link, and means responsive to the first, second, and third sensor means for controlling the linear actuator to adjust the lateral angle of inclination of the earth working implement, comprising means to calculate the change in height between the first and second draft links with signals from the second and third sensor means, means to calculate the vertical angle of the first draft link, means to set a selected lateral angle of inclination of the implement, and means for calculation of control lateral angle inclination of the earth working implement to provide lateral inclination control of the earth working implement.

6. The structure of claim 5 wherein: the linear actuator comprises a piston and cylinder assembly, and the means responsive to the first, second, and third sensor means includes solenoid actuated valve means connected to the piston and cylinder assembly to control the flow of fluid under pressure to said piston and cylinder assembly whereby the length of the piston and cylinder assembly is adjusted, and pump means for supplying fluid under pressure to the valve means.

7. In combination: an implement for moving material on the ground including earth, a tractor having hitch means connected to the implement, said hitch means including a first draft link, a first lift link, a first link connecting the first draft link to the first lift link, a second draft link laterally spaced from the first draft link, a second lift link, a linear actuator means connected to the second draft link and second lift link operable to control the lateral angle of inclination of the implement relative to the ground, first and second draft links to change the elevation of the implement, first sensor means for sensing the lateral inclination of the tractor relative to the ground related to the sensed lateral angle of inclination, second sensor means connected to the first draft link and first lift link providing a second signal related to the distance between the first draft link and first link lift, third sensor means connected to the second draft link and second lift link providing a third signal related the distance between the second draft link and second lift link, and fourth means responsive to said first, second, and third signals for controlling the length of said actuator means to control the lateral angle of inclination of the implement relative to the ground.

8. The structure of claim 7 wherein: the linear actuator means comprises a piston and cylinder assembly.

9. The structure of claim 8 wherein: the fourth means includes solenoid actuated valve means connected to the piston and cylinder assembly, and pump means for supplying fluid under pressure to the valve means whereby on operation of the valve means the length of the piston and cylinder assembly is changed to affect the change in the lateral inclination of the implement.

* * * * *